(12) United States Patent
Barzelay

(10) Patent No.: US 10,688,609 B2
(45) Date of Patent: Jun. 23, 2020

(54) TORQUE WRENCH HAVING IMPACT ENGAGER

(71) Applicant: TYM LABS L.L.C., Saddle Brooke, NJ (US)

(72) Inventor: Abraham Barzelay, Paramus, NJ (US)

(73) Assignee: TYM LABS, L.L.C., Saddle Brook, NJ (US)

( * ) Notice: Subject to any disclaimer, the term of this patent is extended or adjusted under 35 U.S.C. 154(b) by 127 days.

(21) Appl. No.: 15/488,016

(22) Filed: Apr. 14, 2017

(65) Prior Publication Data

US 2018/0297158 A1    Oct. 18, 2018

(51) Int. Cl.
- *B25B 19/00* (2006.01)
- *B23P 19/06* (2006.01)
- *B25B 21/02* (2006.01)

(52) U.S. Cl.
CPC .............. *B23P 19/06* (2013.01); *B25B 21/02* (2013.01)

(58) Field of Classification Search
USPC .................. 81/464, 463, 57.44, 60
See application file for complete search history.

(56) References Cited

U.S. PATENT DOCUMENTS

| | | | |
|---|---|---|---|
| 2,740,507 A * | 4/1956 | Shaff | B25B 23/145 173/169 |
| 2,881,884 A | 4/1959 | Amtsberg | |
| 3,174,597 A | 3/1965 | Schaedler et al. | |
| 3,491,839 A | 1/1970 | McIntire | |
| 3,605,914 A | 9/1971 | Kramer | |
| 3,661,217 A | 5/1972 | Maurer | |
| 3,960,035 A * | 6/1976 | Workman, Jr. | B25B 21/002 475/125 |
| 4,063,601 A | 12/1977 | Biek | |
| 4,532,832 A * | 8/1985 | Christensen | B25B 13/467 81/57.29 |
| 4,919,022 A * | 4/1990 | Ono | B25B 21/004 173/93.5 |
| 9,592,591 B2 * | 3/2017 | McClung | B25B 19/00 |
| 9,592,593 B2 | 3/2017 | Chen et al. | |
| 9,737,978 B2 * | 8/2017 | Golden | B25B 21/026 |
| 2002/0035876 A1 | 3/2002 | Donaldson, Jr. | |
| 2009/0014192 A1 | 1/2009 | Ito et al. | |
| 2010/0064864 A1 * | 3/2010 | Kobayashi | B25B 21/02 81/464 |
| 2017/0001289 A1 | 1/2017 | Söderlund | |

OTHER PUBLICATIONS

International Search Report and Written Opinion dated Sep. 17, 2018, issued in PCT/US2018/027241 (9 pages).

* cited by examiner

*Primary Examiner* — Joseph J Hail
*Assistant Examiner* — Shantese L McDonald

(57) ABSTRACT

An engager is disclosed for use with a torque wrench. The engager may include a housing connectable to a rotating output of a motor, and a motor rotor slidingly disposed in and mechanically locked to rotate with the housing. The engager may also include a tool rotor connectable to a rotating input of the torque wrench, and a fluid piston configured to effect selective engagement of the motor rotor with the tool rotor.

20 Claims, 6 Drawing Sheets

TORQUE WRENCH HAVING IMPACT ENGAGER

TECHNICAL FIELD

The present disclosure is directed to a torque wrench assembly and, more particularly, to a torque wrench assembly having an impact engager.

BACKGROUND

A torque wrench is a tool designed to exert torque on a fastener (e.g., on a bolt head or nut having specially designed inner and/or outer surfaces) to loosen or tighten the fastener. In some embodiments, the torque wrench is powered. For example, the torque wrench can be hydraulically, pneumatically, or electrically powered. Regardless of the way in which the wrench is powered, in some situations (e.g., when a fastener is stuck), the force exerted by the wrench on the fastener is too little.

Some torque wrenches are capable of generating high-impact forces that help to loosen a stuck fastener. These wrenches are known as impact wrenches. Impact wrenches are designed to generate a high-torque output from a hammering mechanism inside the wrench. Conventional impact wrenches include a high-mass rotating hammer or reciprocating piston that are driven by a flow of pressurized air or oil. The rotating hammer and reciprocating piston are repetitively connected to an output of the wrench, such that a sudden transfer of the associated inertia can be used to generate levels of torque on the fastener otherwise not available.

Although acceptable in some applications, conventional impact wrenches can be loud, difficult to handle, slow, and provide inconsistent and/or inaccurate levels of torque output. In addition, even when the hammering effect is not needed and/or undesired, the hammering cannot be easily turned off. For this reason, conventional impact wrenches are primarily used only when a fastener is stuck and cannot be turned. After the bolt begins to turn, a non-impact torque wrench can then be used to remove or install the fastener at a faster rate.

The torque wrench assembly and impact engager of the present disclosure solve one or more of the problems set forth above and/or other problems of the prior art.

SUMMARY

One aspect of the present disclosure is directed to an engager for use with a torque wrench. The engager may include a housing connectable to a rotating output of a motor, and a motor rotor slidingly disposed in and mechanically locked to rotate with the housing. The engager may also include a tool rotor connectable to a rotating input of the torque wrench, and a fluid piston configured to effect selective engagement of the motor rotor with the tool rotor.

Another aspect of the present disclosure is directed to a torque wrench assembly. The torque wrench assembly may include a fluid motor having a rotational output, a torque wrench having a rotational input, and an engager disposed between the rotational output of the fluid motor and the rotational input of the torque wrench. The engager may be configured to selectively operate in a continuous rotation mode and in an impact rotation mode to connect the rotational output to the rotational input.

Another aspect of the present disclosure is directed to a fluid circuit for a torque wrench. The fluid circuit may include a source of pressurized fluid, a motor driven by pressurized fluid, and an engager moveable by pressurized fluid to selectively connect a rotational output of the motor to a rotational input of the torque wrench during operation in a continuous mode and in an impact mode. The fluid circuit may also include an engager valve configured to regulate fluid flow to the engager, and a controller configured to cause movement of the engager valve.

DETAILED DESCRIPTION

Figure 1:
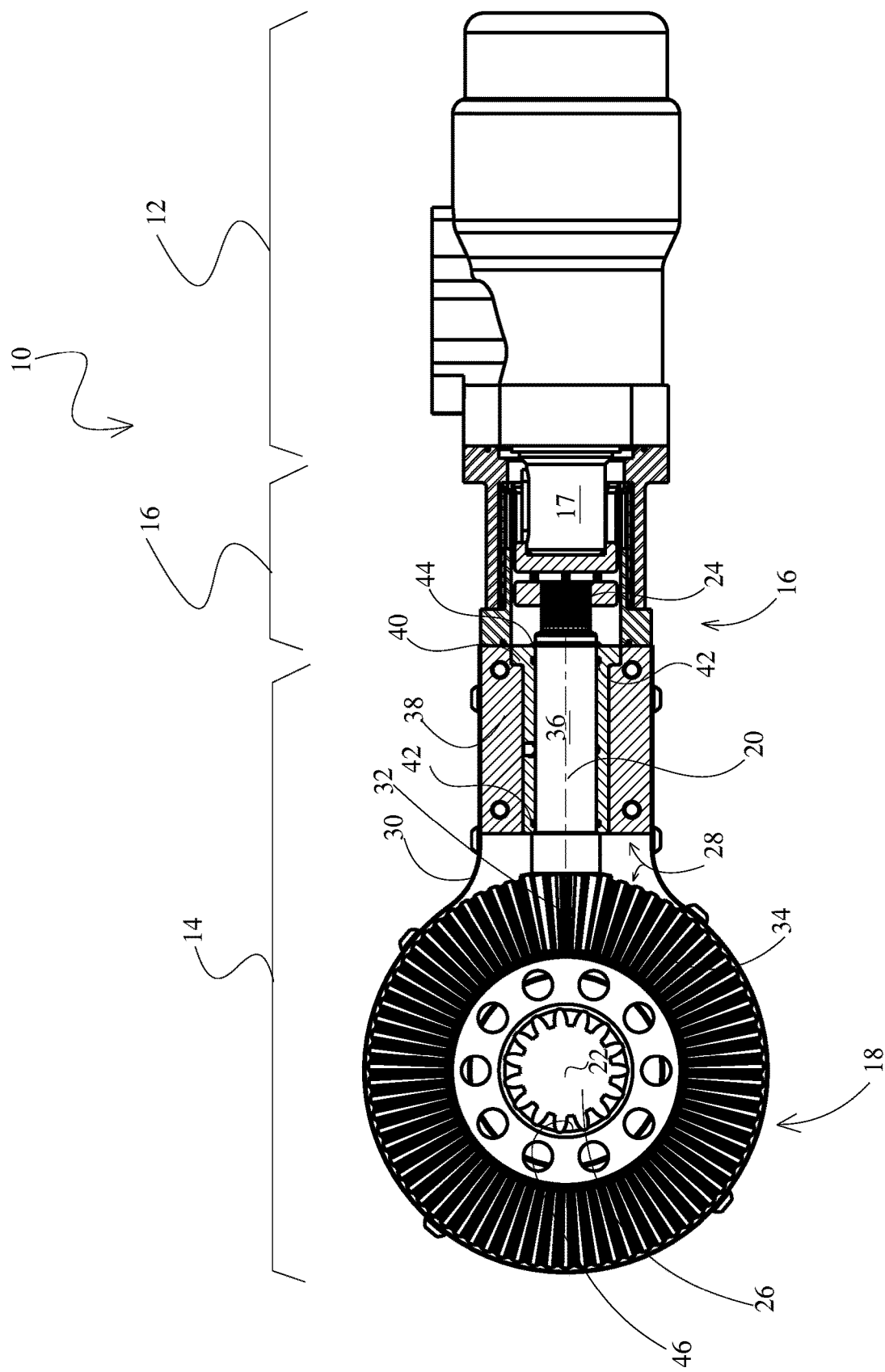
FIG. 1 is an isometric illustration of an exemplary disclosed torque wrench.

FIG. 1 illustrates an exemplary torque wrench assembly ("assembly") 10 that can be used to loosen or tighten a fastener (e.g., a bolt having a head with internal and/or external engagement features—not shown). Assembly 10 may include, among other things, a motor 12 configured to generate a rotational output when driven by pressurized fluid, a torque wrench 14 configured to receive a rotational input, and an engager 16 configured to selectively connect the rotational output of motor 12 to the rotational input of wrench 14. As will be described in more detail below, engager 16 may be operational to transmit the rotational output from motor 12 to the rotational input of wrench 14 in a continuous mode and in an interrupted or impact mode.

Motor 12 may be any type of fluid-driven motor known in the art. For example, motor 12 may be a radial-piston motor, an axial-plunger motor, a gear-and-vane motor, a gerotor motor, or another type of motor. As pressurized fluid (e.g., air, oil, etc.) is directed through motor 12, motor 12 may generate the rotational output at an engagement interface (e.g., a socket; a splined, torx, or square stub shaft; etc.) 17 that is configured to mate with a corresponding interface of engager 16.

Wrench 14 may generally be divided into an input end 16 and an output end 18. Input end 16 may be configured to receive the continuous rotational input from motor 12 (e.g., via engager 16), which is then transformed (e.g., within engager 16) into a continuous or impact rotational output at output end 18. The rotational input may be generally aligned with a first axis 20 of wrench 14, while the rotational output may be generally aligned with a second axis 22 that is substantially (e.g., within 0-10°) orthogonal to first axis 20. Input end 16 may include an engagement interface (e.g., a socket; a splined, torx, or square stub shaft; etc.) 24 configured to mate with a corresponding interface of engager 16 and receive the rotational input. Output end 18 may include one or more drive fittings 26 configured to mate directly with the bolt to be turned and/or with an adapter (not shown) that transmits the rotational output to the bolt.

As shown in FIG. 1, wrench 14 may be assembly of multiple different components that cooperate to transfer torque received at input end 16 to output end 18. These components may include, among other things, a gear train 28, a housing 30 configured to support and enclose gear train 28, and a variety of hardware that retains and seals gear train 28 within housing 30.

In the disclosed embodiment, gear train 28 includes a pinion gear 32 and a crown gear 34. Pinion gear 32 may be formed at an end of a shaft 36 that extends to engagement interface 24, and may include a plurality of teeth that engage and drive corresponding teeth of crown gear 34. In the disclosed embodiment, the teeth of pinion gear 32 and crown gear 34 are beveled, such that pinion gear 32 may rotate about axis 20 while crown gear 34 rotates about axis 22. It is contemplated that the teeth of these gears could be straight and have a conical pitch (e.g., pinion gear 32 could be a straight bevel gear), curved and have a conical pitch (e.g., pinion gear 32 could be a spiral bevel gear), or curved and have a hypoid pitch (e.g., pinion gear 32 could be a hypoid bevel gear), as desired.

Pinion gear 32 may be supported within housing 30 by way of a bearing block 38. For example, a bearing (e.g., bushing, needle bearing, roller bearing, etc.) 40 may be disposed within bearing block 38 and configured to slidingly receive shaft 36 in an axial direction and to support rotation of shaft 36. One or more seals (e.g., o-rings or gaskets) 42 and/or retainers (e.g., circlips, snaprings, etc.) 44 may be used to seal and/or retain bearing 40 and/or shaft 36 in place within housing 30.

Crown gear 34 may have teeth extending toward an outer annular periphery, and include a central opening 46 with engagement features (e.g., internal splines, cogs, gear teeth, etc.) formed therein. These features may be configured to engage corresponding features of drive fitting 26.

Figure 2:
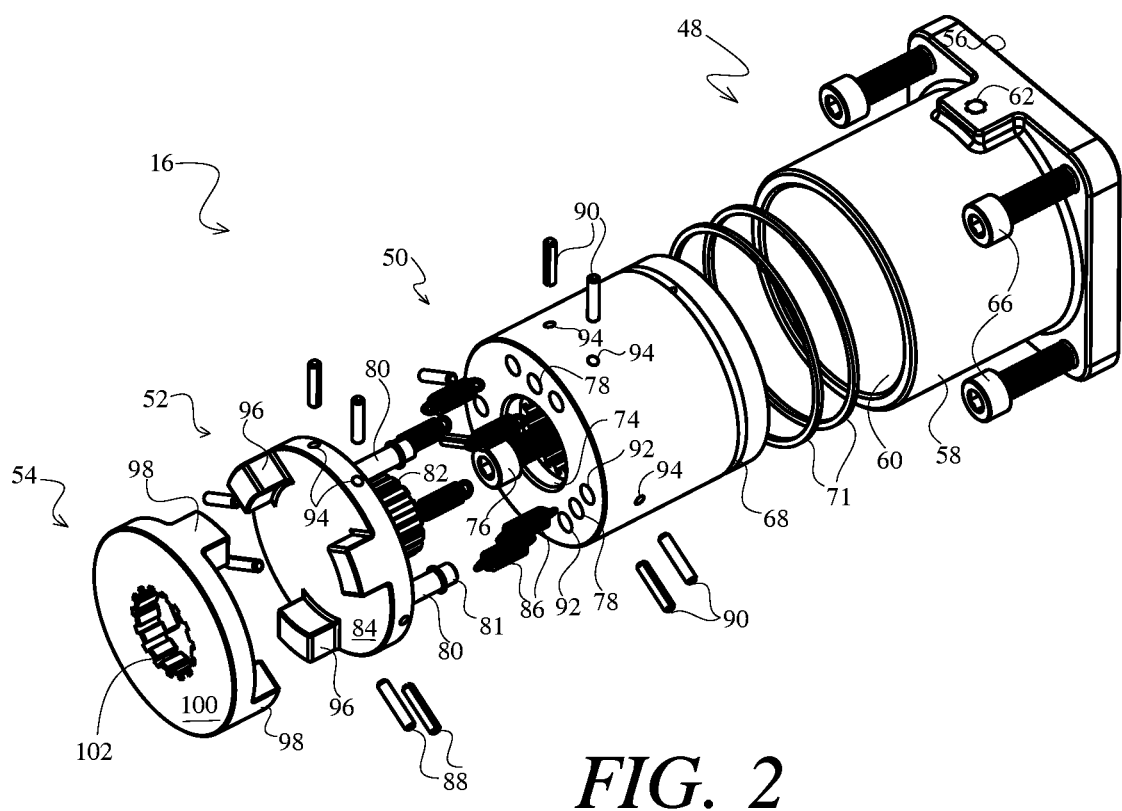
FIG. 2 is an exploded view illustration of an engager that may be used with the torque wrench of FIG. 1.

As shown in FIG. 2, engager 16 may be an assembly of components that cooperate to transmit the continuous rotational output received from motor 12 via interface 17 as a continuous or interrupted rotational input to wrench 14 via interface 24. These components may include, among other things, a mounting flange 48, a rotor housing 50, a motor rotor 52, and a tool rotor 54. As will be explained in more detail below, rotor housing 50 and motor rotor 52 may be driven by motor 12 (referring to FIG. 2) to rotate together within mounting flange 48, and motor rotor 52 may be selectively moved in an axial direction to engage tool rotor 54 and thereby transfer torque to wrench 14 (referring to FIG. 2).

Mounting flange 48 may include an axial end face 56 configured to mate against a corresponding axial end face of motor 12 (referring to FIG. 2), and a protrusion 58 extending away from motor 12 in a normal direction. In the disclosed embodiment, protrusion 58 is generally cylindrical and includes a central bore 60. It is contemplated, however, that protrusion 58 could have another shape (e.g., rectangular), if desired. A fluid inlet 62 may be formed within a side wall of protrusion 58 that extends radially inward to an annular groove 64 (shown only in FIG. 3) inside central bore 60. One or more fasteners 66 may be used to secure (e.g., axially and rotationally secure) mounting flange 48 to motor 12 (e.g., to a stationary portion of motor 12—referring to FIG. 1).

Rotor housing 50 may be generally cylindrical and configured to be received (e.g., completely disposed) within central bore 60 of mounting flange 48. Rotor housing 50 may include an annular groove 68 formed in an outer surface 70. When rotor housing 50 is assembled into mounting flange 48, groove 68 may be generally aligned with groove 64, such that a complete annular channel (see FIG. 3) is created by the aligned grooves. One or more seals (e.g., o-rings) 71 may be disposed radially between rotor housing 50 and mounting flange 48 (e.g., at opposing axial sides of the annular channel—See FIG. 3) to inhibit fluid leakage from the annular channel.

Figure 3:
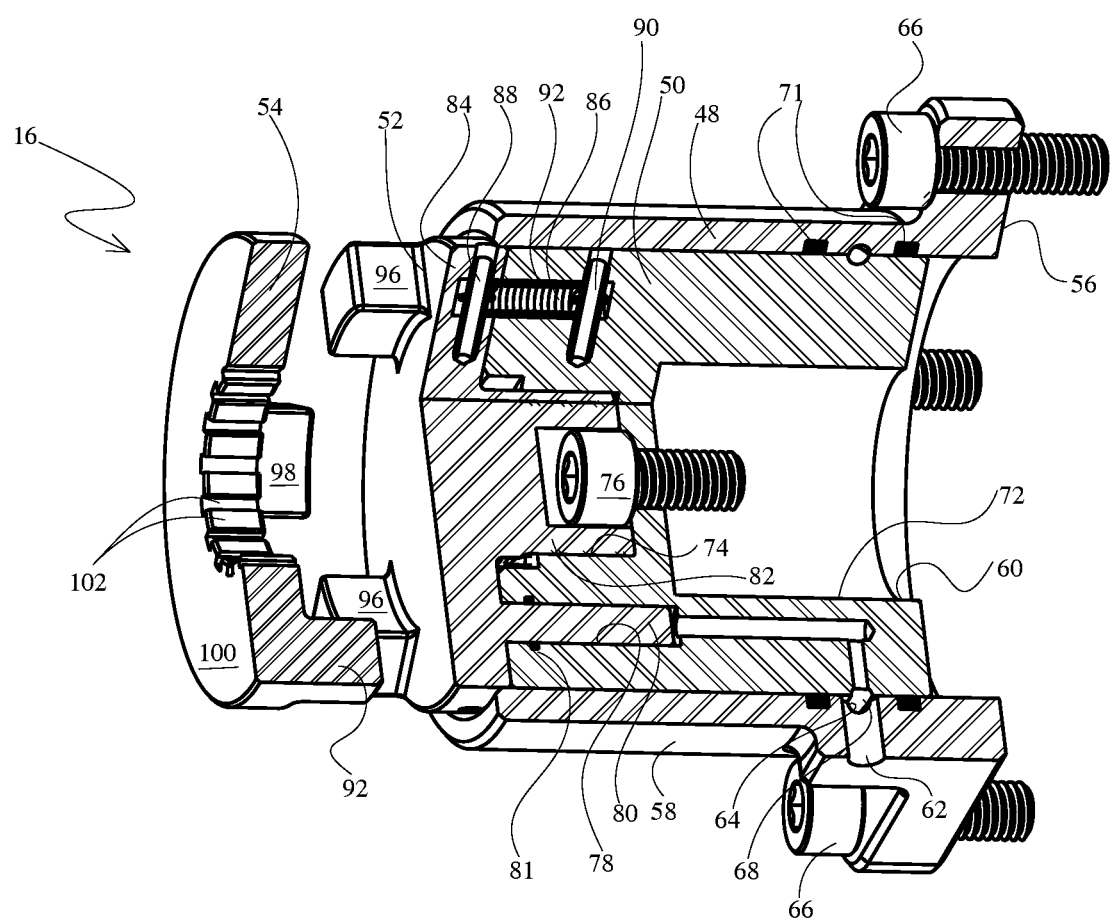
FIG. 3 is a cross-sectional view illustration of the engager of FIG. 2.

As shown in FIGS. 2 and 3, rotor housing 50 may also include a first central bore 72 (shown only in FIG. 3) at an input end, and a second central bore 74 located at an output end. Bores 72 and 74 may have the same or different diameters, and the same or different axial lengths, as desired. Bore 72 may be configured to receive engagement interface 17 of motor 12 (referring to FIG. 1). In some embodiments, the rotation of rotor housing 50 may be locked to the rotation of the output shaft (e.g., via a shear key—not shown). Rotor housing 50 may be axially retained in connection with engagement interface 17 of motor 12 via a fastener 76 that is inserted into rotor housing 50 via bore 74. Bore 74 may be configured to additionally receive an input end of motor rotor 52 (e.g., in an axially sliding manner).

Any number of (e.g., three) piston bores 78 may be formed with the output end of rotor housing 50 and annularly distributed around central bore 74. Piston bores 78 may be oriented in an axial direction of rotor housing 50 and, as shown in FIG. 3, each fluidly connected to the channel formed by grooves 64 and 68.

Motor rotor 52 may include integral plungers 80 configured to be axially and slidingly received within piston bores 78 and thereby form a plurality of fluid pistons. One or more seals (e.g., o-rings) 81 may be disposed radially between plungers 80 and piston bores 78, to create a sealed control chamber inside each fluid piston. As will be explained in more detail below, the sealed control chambers may be selectively filled with pressurized fluid (e.g., via the channel formed by grooves 64 and 68), causing plungers 80 to extend axially out of piston bores 78 and thereby push motor rotor 52 away from rotor housing 50 and into engagement with tool rotor 54.

Motor rotor 52 may be locked to rotate with rotor housing 50. In one embodiment, plungers 80 may provide for this locking function. For example, as rotor housing 50 is caused to rotate, the annular walls of piston bores 78 may press against the annular surfaces of plungers 80, thereby urging plungers 80 and motor rotor 52 to also rotate. In another embodiment, however, a stub shaft 82 may extend from motor rotor 52 into bore 74 of rotor housing 50. In this embodiment, stub shaft 82 may include external features (e.g., splines) configured to engage corresponding features inside of bore 74 and thereby transfer torque from rotor housing 50 to motor rotor 52.

Base ends of plungers 80 may be connected to each other by an intermediate disk-shaped body 84. Connection between motor rotor 52 and rotor housing 50 may be maintained via one or more biasing mechanisms (e.g., springs) 86 that extend between body 84 and rotor housing 50. For example, a first end of each spring 86 may be connected to body 84 via a first pin 88, while an opposing second end of each spring 86 may be connected to rotor housing 50 via a second pin 90. In the disclosed embodiment, springs 86 reside within spring bores 92 located adjacent piston bores 78. Pins 88 and 90 may be inserted into the ends of springs 86 via radial passages 94 formed within each of body 84 and rotor housing 50. As will be explained in more detail below, as piston bores 78 fill with pressurized fluid and cause plungers 80 to extend and push motor rotor 52 away from rotor housing 50, springs 86 may stretch and generate an increasing biasing force that urges motor rotor 52 back toward rotor housing 50. As piston bores 78 are drained of fluid, springs 86 may return motor rotor 52 back to its original position against the output end of rotor housing 50 (and out of engagement with tool rotor 54).

Any number of (e.g., three) engagement features (e.g., cogs, gear teeth, etc.) 96 may extend from body 84 in a normal direction opposite plungers 80. Features 96 may be located around a periphery of body 84, with spacing between adjacent features 96.

Tool rotor 54 may include engagement features (e.g., cogs, gear teeth, etc.) 98 at an input end that are similar to those at the output end of motor rotor 52. Features 98 may be configured to fit into the spacing between features 96 when motor rotor 52 is in its extended position, and thereby facilitate torque transfer from motor rotor 52 to tool rotor 54. In addition, tool rotor 54 may include a disk-shaped body 100 at its output end, with corresponding internal engagement features (e.g., female splines) 102 that are configured to rotationally interlock with engagement interface 24 of wrench 14 (referring to FIG. 1).

Figure 4:
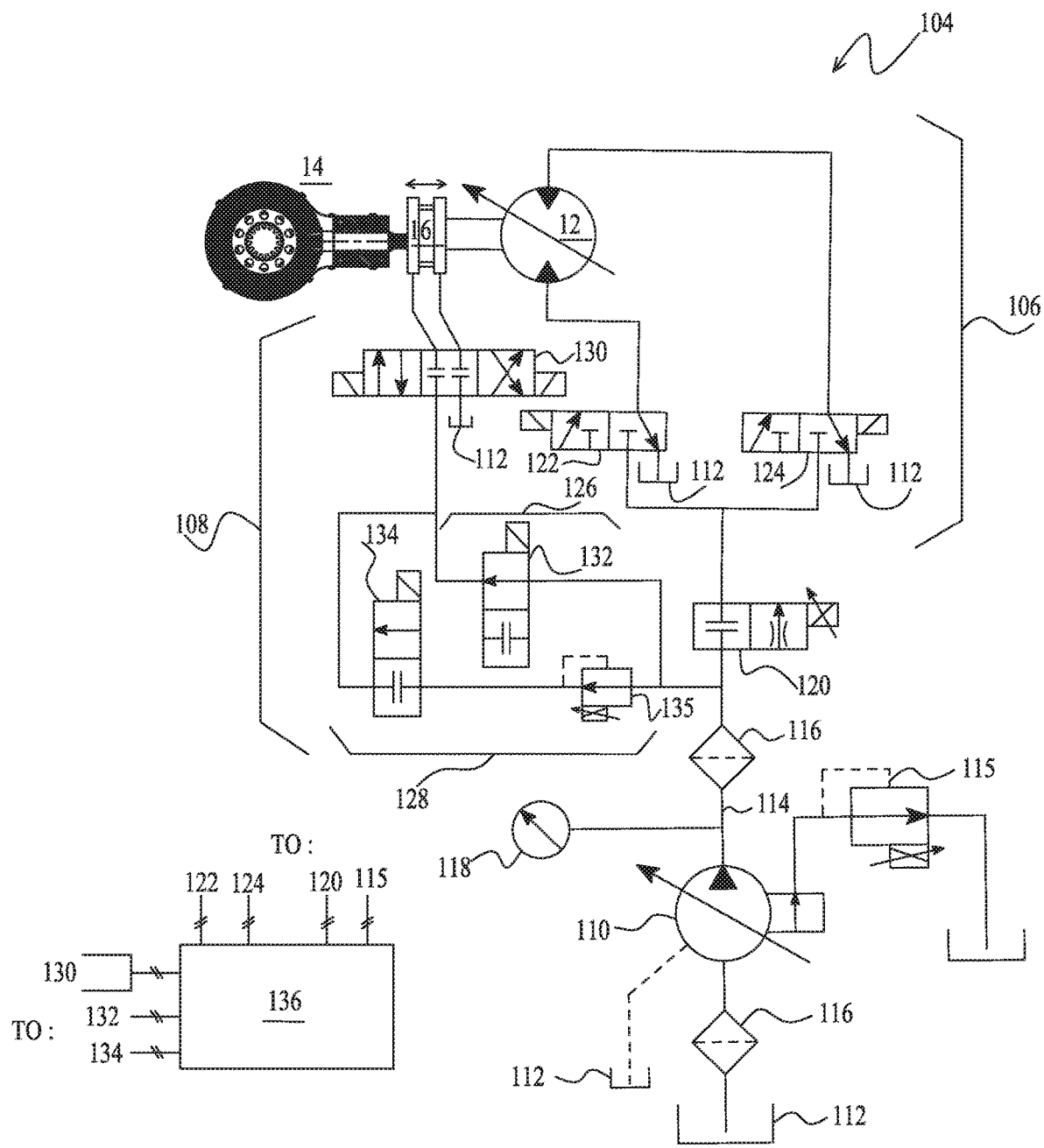
FIGS. 4-6 are schematics of exemplary circuits associated with the torque wrench of FIG. 1 and the engager of FIGS. 2 and 3.

FIG. 4 illustrates an exemplary fluid circuit 104 that may be used to power wrench 14. In this example, the fluid circulating through circuit 104 is oil and used to power both motor 12 and engager 16. Circuit 104 may include a motor branch 106 associated with motor 12, and an engager branch 108 associated with engager 16. Both of branches 106 and 108 may be connected to a common source of pressurized fluid (e.g., to a pump 110 that draws oil from a low-reservoir 112) via a supply passage 114. In the disclosed embodiment, pump 110 is a unidirectional variable-displacement pump, having an associated displacement and/or pressure control valve 115. It is contemplated that pump 110 could be another type of pump (e.g., a fixed displacement pump, an over-center pump, etc.), if desired. One or more filters 116 (e.g., an inlet filter and an outlet filter) and/or pressure regulators 118 may be associated with pump 110 and/or supply passage 114.

Motor branch 106 may be selectively communicated with supply passage 114 via an electronically-controlled and variable-position valve 120. Any time valve 120 is in an on-position, motor 12 may be rotating and, any time valve 120 is in an off-position (shown in FIG. 4), motor 12 may be hydraulically locked from rotation. Valve 120 may be moved to any position between the on- and off-positions to vary a fluid flow rate to motor 12 and a corresponding speed of motor rotation.

A direction of motor rotation may be controlled by first and second directional valves 122 and 124, which are fluid disposed downstream of valve 120 (i.e., between alve 120 and motor 12). Each of valves 122 and 124 may be electronically-controlled two-position valves, which can be moved from a closed-position (shown in FIG. 4) at which the fluid valve 120 is blocked, to an open-position at which fluid is directed through the corresponding valve to motor 12 in a corresponding direction. To cause rotation of motor 12 in a first direction (e.g., in a clockwise direction), valve 122 may be moved to the open-position, while valve 124 remains in the closed-position. And to cause rotation of motor 12 in a second direction (e.g., in a counterclockwise direction), valve 122 may remain in the closed-position, while valve 124 is moved to the open-position.

Engager branch 108 may include a continuous rotation sub-branch 126 and an impact or interrupted sub-branch branch 128 associated with operation in the continuous and impact modes, respectively. Both of sub-branches 126, 128 may extend from supply passage 114 (e.g., at a location upstream of valve 120) to a directional control valve 130. During operation in the continuous mode, an electronically-controlled two-position valve 132 in sub-branch 126 may be selectively moved from a closed position to an open position (shown in FIG. 4) to allow pressurized fluid from supply passage 114 to flow to valve 130 in an uninterrupted manner. Valve 132 may remain in the open position as long as rotation of wrench 14 is desired. In contrast, during operation in the interrupted mode, valve 132 may remain closed and, instead, an electronically-controlled two-position valve 134 in sub-branch 128 may be selectively cycled between open and closed positions to allow pressurized fluid from supply passage 114 to flow to valve 130 in an intermittent manner. In some examples, a pre-pressure compensator 135 may be located upstream of valve 134 to reduce pressure fluctuations within fluid circuit 104 caused by the openings and closings of valve 134.

In one embodiment, a timing between openings of valve 134 may be regulated to thereby control an impact force of wrench 14. In particular, when valve 134 is opened at a time when motor 12 is spinning slowly (e.g., when displacing fluid at a low rate), engager 16 may be extended to transfer an associated small fluid inertia of motor 12 to wrench 14 in the form of torque. In contrast, when valve 134 is opened at a time when motor 12 is spinning faster (e.g., when displacing fluid at a greater rate), engager 16 may be extended to transfer an associated larger fluid inertia of motor 12 to wrench 14 in the form of torque. In one example, the sequential openings of valve 134 may be delayed by an amount of time that allows motor 12 to spin up to a maximum speed before transferring its fluid momentum to wrench 14 in the form of torque (and thereby slowing down).

The movement direction of engager 16 (i.e., whether engager 16 is connecting or disconnecting motor 12 and wrench 14) may be controlled via valve 130. Valve 130 may be, for example, an electronically-controlled three-position valve that is movable between a closed position (shown in FIG. 4), an engaging position, and a disengaging position. When valve 130 is in the engaging position, fluid from sub-branch 126 or sub-branch 128 may be directed to fill piston bores 78 (e.g., via inlet 62 and grooves 64, 68—referring to FIG. 3) with pressurized fluid, thereby causing the extension of plungers 80 and the engagement of motor rotor 52 with tool rotor 54. When valve 130 is in the disengaging position, fluid from piston bores 78 may be drained to reservoir 112, thereby allowing springs 86 to pull motor rotor 52 away from and out of engagement with tool rotor 54. It is contemplated that the functionality of valve 130, valve 132, and/or valve 134 could be combined in different ways (e.g., in a two-valve configuration or a single-valve configuration), if desired.

A controller 136 may be used to regulate movement of valves 115, 120, 122, 124, 130, 132, 134, and/or 135. Controller 136 may embody a single processor or multiple processors that include a means for controlling an operation of fluid circuit 104. Controller 136 may include one or more general or special purpose processors or microprocessors. Controller 136 may further include or be associated with a memory for storing data such as, for example, design limits, performance characteristics, operational instructions, and corresponding parameters of each component of fluid circuit 104. Various other known electrical circuits may be associated with controller 136, including power supply circuitry, signal-conditioning circuitry, solenoid driver circuitry, communication circuitry, and other appropriate circuitry. Moreover, controller 136 may be capable of communicating with any or all of the components of fluid circuit 104 via wired and/or wireless transmission.

Figure 5:
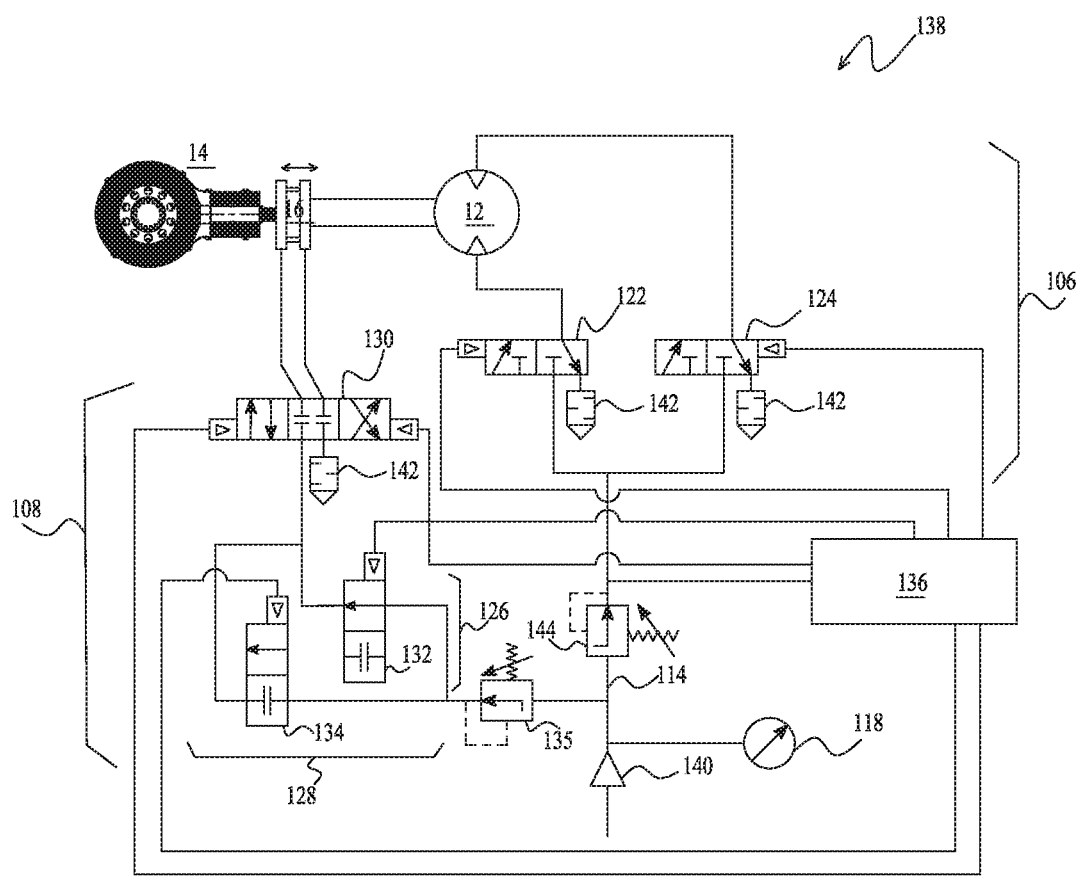

In some application (e.g., in liquid fuel and/or gas pipeline applications), electricity is not allowed to be used for control purposes (or any other purpose) within torque wrench assembly 10. In these instances, pressurized air may be used to both control and power torque wrench assembly 10. FIG. 5 illustrates an exemplary fluid circuit 138 that uses only air as the control and working fluid. Fluid circuit 138 may include many of the same (or at least similar) components included within fluid circuit 104 (referring to FIG. 4). For example, fluid circuit 138 may include a source of pressurized fluid (e.g., an air compressor or tank) 140 to direct the fluid to branch passages 106 and 108 (and two sub-branches 126 and 128) via supply passage 114. In addition, fluid circuit 138 may include regulator 118; valves 122, 124, 130, 132, and 138; pre-pressure compensator 135; and controller 136. However, these components may be pilot-operated (e.g., instead of being solenoid-operated) by flows of pressurized air (instead of by electricity), which are controlled by controller 136. In addition, instead of draining fluid to a reservoir, any draining fluid being drained may be released to the atmosphere via a corresponding vent 142. And finally, in place of valve 120, an additional pre-pressure compensator 144 may be utilized.

In some applications where use of electricity is not allowed, the performance (e.g., maximum torque output and/or rotational speed) achieved via pressurized air alone may be limited. In these situations, two different fluids may be used to separately control and power torque wrench assembly 10. In these instances, pressurized air may be used to control torque wrench assembly 10 (like in the embodiment of FIG. 5), and pressurized oil may be used to power torque wrench assembly 10 (like in the embodiment of FIG. 4).

Figure 6:
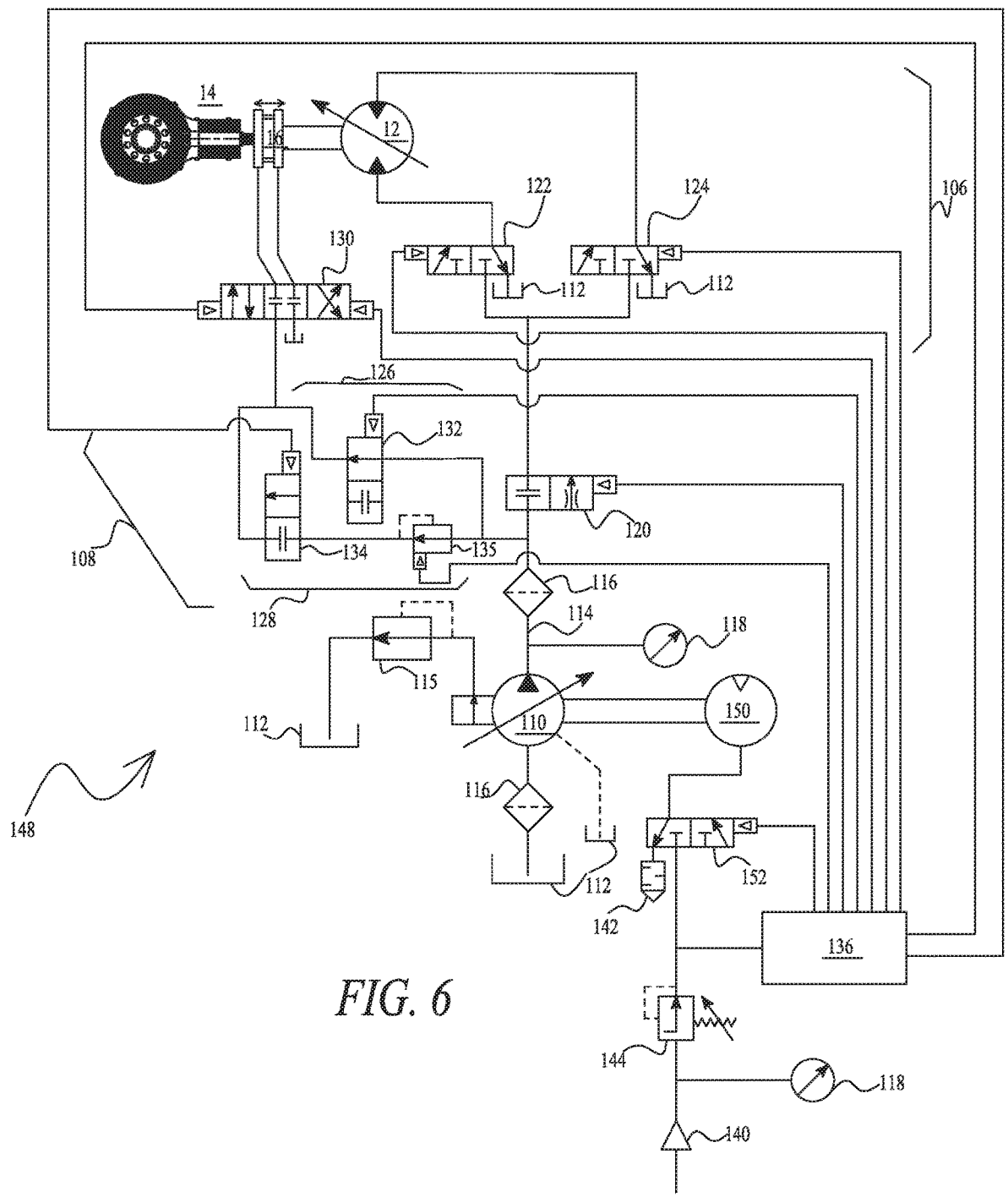

FIG. 6 illustrates an exemplary dual-fluid circuit 148 that uses air as the control fluid and oil as the working fluid. Fluid circuit 148 may include many of the same (or at least similar) components included within fluid circuit 104 (referring to FIG. 4) and fluid circuit 138 (referring to FIG. 5). For example, fluid circuit 148 may include a source of pressurized air (e.g., an air compressor or tank) 140 and a source of pressurized oil (e.g., pump) 110. The pressurized air may be directed as pilot-fluid to valves 120, 122, 124, 130, 132, 134, and 135, while the pressurized oil may be directed as the working fluid to branch passages 106 and 108 (and to sub-branches 126 and 128) via supply passage 114. In addition, fluid circuit 148 may include two regulators 118 (one for air and one for oil), and controller 136. Fluid circuit 148 may also include pre-pressure regulator 144. And finally, in some embodiments, an additional air-powered motor 150 may be supplied with pressurized air from source 114 and utilized to drive pump 110 (e.g., via a common shaft). A pilot-operated two-position valve 152 may be moved to regulate the speed and/or torque of motor 150.

Although several different combinations of power and control have been disclosed above in connection with torque wrench assembly 10, it is contemplated that additional combinations may be possible. In particular, any one of pressurized air, pressurized oil, or electricity may be used to power motor 12 at the same time that any one of pressurized air, pressurized oil, or electricity is used to control operation of engager 16.

INDUSTRIAL APPLICABILITY

The torque wrench assembly of the present disclosure has wide application in many different industries. The disclosed torque wrench assembly may be used anywhere that fasteners are to be loosened or tightened with high-levels of torque and/or at high speed. For example, the disclosed torque wrench may be used in the oil and gas industry to join segments of a pipeline together.

The disclosed torque wrench assembly may be capable of reliably producing high-levels of impact torque when needed, and also of reliably producing smooth continuous torque when needed. In particular, the disclosed engager may allow for a continued direct engagement between an associated motor and torque wrench, or an interrupted connection that allows for impact forces at the output of the torque wrench. Operation between the continuous and impact modes may be automatically and/or manually regulated via the disclosed controller. In addition, the intermittent connection between the motor and torque wrench may be timed by the controller in such a manner as to produce a maximum amount of torque output available for a given motor/wrench configuration.

The disclosed torque wrench assembly may be versatile. Specifically, because the disclosed torque wrench assembly may be used with multiple power sources (e.g., electrical, hydraulic, and/or pneumatic sources), the torque wrench assembly may be used anywhere, at any time, and in any situation. In addition, the ability to fully operate the disclosed torque wrench assembly in situations where electrical power is not allowed, provides greater application and safety in its use.

It will be apparent to those skilled in the art that various modifications and variations can be made to the torque wrench assembly and engager of the present disclosure without departing from the scope of the disclosure. Other embodiments will be apparent to those skilled in the art from consideration of the specification and practice of the torque wrench assembly and engager disclosed herein. It is intended that the specification and examples be considered as exemplary only, with a true scope of the disclosure being indicated by the following claims and their equivalents.

What is claimed is:

1. An engager for a torque wrench, the engager comprising:
   a rotor housing connectable to a rotating output of a motor and rotatable thereby;
   a motor rotor axially moveable and mechanically rotatable with the rotor housing;
   a tool rotor connectable to a rotating input of the torque wrench; and
   a piston configured to axially move the motor rotor relative to the rotor housing while maintaining a rotatable engagement between the motor rotor and the rotor housing to effect selective engagement of the motor rotor with the tool rotor,
   wherein the engager may be operated in an impact mode in which the motor rotor rotates without being rotationally engaged to the tool rotor until being advanced by the piston into rotational engagement with the tool rotor to provide an impact force with the torque wrench.

2. The engager of claim 1, further including a biasing mechanism operatively connected to the motor rotor and configured to exert a biasing force in opposition to a force exerted by the piston.

3. The engager of claim 2, wherein the biasing mechanism is connected between the rotor housing and the motor rotor.

4. The engager of claim 2, wherein the piston is a fluid piston and wherein the fluid piston is configured to move the motor rotor against the biasing force of the biasing mechanism and into engagement with the tool rotor when the fluid piston is filled with fluid.

5. The engager of claim 4, wherein the fluid is oil that also drives rotation of the motor.

6. The engager of claim 4, wherein the fluid is different from a fluid that drives rotation of the motor.

7. The engager of claim 6, wherein the fluid that fills the fluid piston is air.

8. The engager of claim 1, wherein when in the impact mode, the motor rotor is intermittently advanced by the piston into rotational engagement with the tool rotor.

9. The engager of claim 1, wherein:
the rotor housing includes splines at a first end that are configured to receive the rotating output of the motor, and splines at an opposing second end; and
the motor rotor includes splines configured to engage the splines of the rotor housing at the opposing second end.

10. The engager of claim 1, wherein the engager may also be operated in a continuous mode in which the motor rotor is continuously advanced by the piston into rotational engagement with the tool rotor.

11. The engager of claim 1, wherein the piston includes:
a tube formed in the housing; and
a plunger extending from the motor rotor into the tube.

12. The engager of claim 1, wherein:
the motor rotor includes a first plurality of spaced apart cog teeth; and
the tool rotor includes a second plurality of spaced apart cog teeth configured to engage the first plurality of spaced apart cog teeth of the motor rotor.

13. A torque wrench assembly; comprising:
a motor having a rotational output;
a torque wrench having a rotational input; and
an engager disposed between the rotational output of the motor and the rotational input of the torque wrench, the engager configured to selectively operate in a continuous rotation mode and in an impact rotation mode to connect the rotational output to the rotational input, wherein the engager includes:
a rotor housing connected to the rotational output of the motor and rotatable thereby;
a motor rotor axially moveable and mechanically rotatable with the rotor housing;
a tool rotor connected to the rotational input of the torque wrench; and
a piston configured to axially move the motor rotor relative to the rotor housing which maintaining a rotatable engagement between the motor rotor and the rotor housing to selectively move the motor rotor into rotational engagement with the tool rotor.

14. The torque wrench assembly of claim 13, wherein the engager includes a spring configured to bias the motor rotor away from the tool rotor.

15. The torque wrench assembly of claim 13, wherein the piston is driven by oil that also drives rotation of the motor.

16. The torque wrench assembly of claim 13, wherein:
the piston is driven by one of air and oil.

17. A fluid circuit for a torque wrench assembly, the fluid circuit comprising:
a source of pressurized fluid capable of driving a motor;
an engager having a rotor housing connected to a rotational output of the motor and rotatable thereby, the engager moveable axially by pressurized fluid to connect a rotational output of the motor to a rotational input of a torque wrench during operation in a continuous mode and to selectively connect a rotational output of the motor to a rotational input of the torque wrench during operation in an impact mode;
an engager valve configured to regulate fluid flow to the engager; and
a controller configured to cause movement of the engager valve and to switch between the continuous mode and the impact mode.

18. The fluid circuit of claim 17, further including:
a delay branch in the fluid circuit between the source of pressurized fluid and the engager; and
a delay valve disposed in the delay branch,
wherein when in the impact mode, the controller is configured to move the delay valve to direct pressurized fluid to the engager valve only after at least one of a delay time or a speed of the motor has reached a threshold to thereby generate impact forces in the torque wrench.

19. The fluid circuit of claim 17, wherein when in the impact mode, the engager is moveable axially by pressurized fluid to intermittently connect the rotational output of the motor to the rotational input of the torque wrench and wherein one or more of the speed and the timing of the connection is controllable.

20. The fluid circuit of claim 17, wherein:
the engager is driven by air, and
the motor is driven by oil.

* * * * *